(12) United States Patent
Kameswaran et al.

(10) Patent No.: US 10,691,658 B2
(45) Date of Patent: Jun. 23, 2020

(54) AUTOMATICALLY OPTIMIZING RESOURCE USAGE ON A TARGET DATABASE MANAGEMENT SYSTEM TO INCREASE WORKLOAD PERFORMANCE

(71) Applicant: International Business Machines Corporation, Armonk, NY (US)

(72) Inventors: Sowmya Kameswaran, San Jose, CA (US); Peter Bendel, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 15/974,828

(22) Filed: May 9, 2018

(65) Prior Publication Data
US 2019/0347342 A1     Nov. 14, 2019

(51) Int. Cl.
| | |
|---|---|
| G06F 16/00 | (2019.01) |
| G06F 16/21 | (2019.01) |
| G06F 11/34 | (2006.01) |
| G06F 16/23 | (2019.01) |
| G06F 16/25 | (2019.01) |
| G06F 16/22 | (2019.01) |

(52) U.S. Cl.
CPC ........ *G06F 16/217* (2019.01); *G06F 11/3414* (2013.01); *G06F 16/2282* (2019.01); *G06F 16/23* (2019.01); *G06F 16/254* (2019.01)

(58) Field of Classification Search
None
See application file for complete search history.

(56) References Cited

U.S. PATENT DOCUMENTS

| 6,950,848 B1 | 9/2005 | Yousefi |
|---|---|---|
| 7,392,511 B2 | 6/2008 | Brokenshire et al. |
| | (Continued) | |

FOREIGN PATENT DOCUMENTS

| CN | 107408126 A | 11/2017 |
|---|---|---|
| EP | 2212806 A1 | 8/2010 |
| KR | 20040009126 A | 1/2004 |

OTHER PUBLICATIONS

Stolze et al., "Extending Database Accelerators for Data Transformations and Predictive Analytics", Proceedings of the 19th international Conference on Extending Database Technology (EDBT), Mar. 2016, pp. 706-707.

(Continued)

*Primary Examiner* — Bai D Vu
(74) *Attorney, Agent, or Firm* — Yee & Associates, P.C.

(57) ABSTRACT

Loading a set of data into a target database management system (DBMS) from a source DBMS to increase workload performance and decrease resource usage is provided. Using a size and a change rate of tables eligible to be offloaded to the target DBMS, a total central processor unit (CPU) cost corresponding to loading the set of data into to the target DBMS and workload cost savings corresponding to executing one or more workloads on the target DBMS is determined based on a set of one or more load strategies. The total CPU cost is compared with the workload cost savings of each load strategy. An optimal load strategy is selected based on comparing the total CPU cost with the workload cost savings of each load strategy. The set of data is automatically loaded into to the target DBMS from the source DBMS in accordance with the selected optimal load strategy.

25 Claims, 11 Drawing Sheets

(56) References Cited

U.S. PATENT DOCUMENTS

| | | |
|---|---|---|
| 7,395,537 B1 | 7/2008 | Brown et al. |
| 7,885,969 B2 | 2/2011 | Natarajan et al. |
| 7,921,130 B2 | 4/2011 | Hinshaw et al. |
| 8,145,652 B2 | 3/2012 | Bent |
| 8,386,463 B2 | 2/2013 | Bestgen et al. |
| 8,468,151 B2 | 6/2013 | Branscome et al. |
| 8,752,055 B2 | 6/2014 | Huizenga |
| 9,495,418 B2 | 11/2016 | Asaad et al. |
| 9,813,331 B2 | 11/2017 | Bent |
| 9,830,354 B2 | 11/2017 | Asaad et al. |
| 2006/0218123 A1 | 9/2006 | Chowdhuri et al. |
| 2006/0271504 A1 | 11/2006 | Anderson et al. |
| 2009/0077011 A1 | 3/2009 | Natarajan et al. |
| 2009/0157684 A1 | 6/2009 | Andersen et al. |
| 2013/0132370 A1 | 5/2013 | Jaecksch et al. |
| 2013/0275740 A1 | 10/2013 | Smith et al. |
| 2015/0046427 A1 | 2/2015 | Asaad et al. |
| 2015/0046428 A1 | 2/2015 | Asaad et al. |

OTHER PUBLICATIONS

Martin et al., "Near Real-Time Analytics with IBM DB2 Analytics Accelerator", Proceedings of the 16th International Conference on Extending Database Technology, Mar. 2013, pp. 579-588.

Stolze et al., "Seamless Integration of Archiving Functionality in OLTP/OLAP Database Systems Using Accelerator Technologies", BTW, 2013, pp. 383-402.

Sukhwani et al., "Database Analytics Acceleration using FPGAs", Proceedings of the 21st International Conference on parallel Architectures and Compilation Techniques, Sep. 2012, pp. 411-420.

"Sychronizing data in IBM DB2 Analytics Accelerator for z/Os", IBM, accessed Mar. 27, 2018, 6 pages. http://www-01.ibm.com/support/docview_wss?uid=swg27038501.

PCT International Search Report, dated Aug. 26, 2019, regarding Application No. PCT/IB2019/053720, 9 pages.

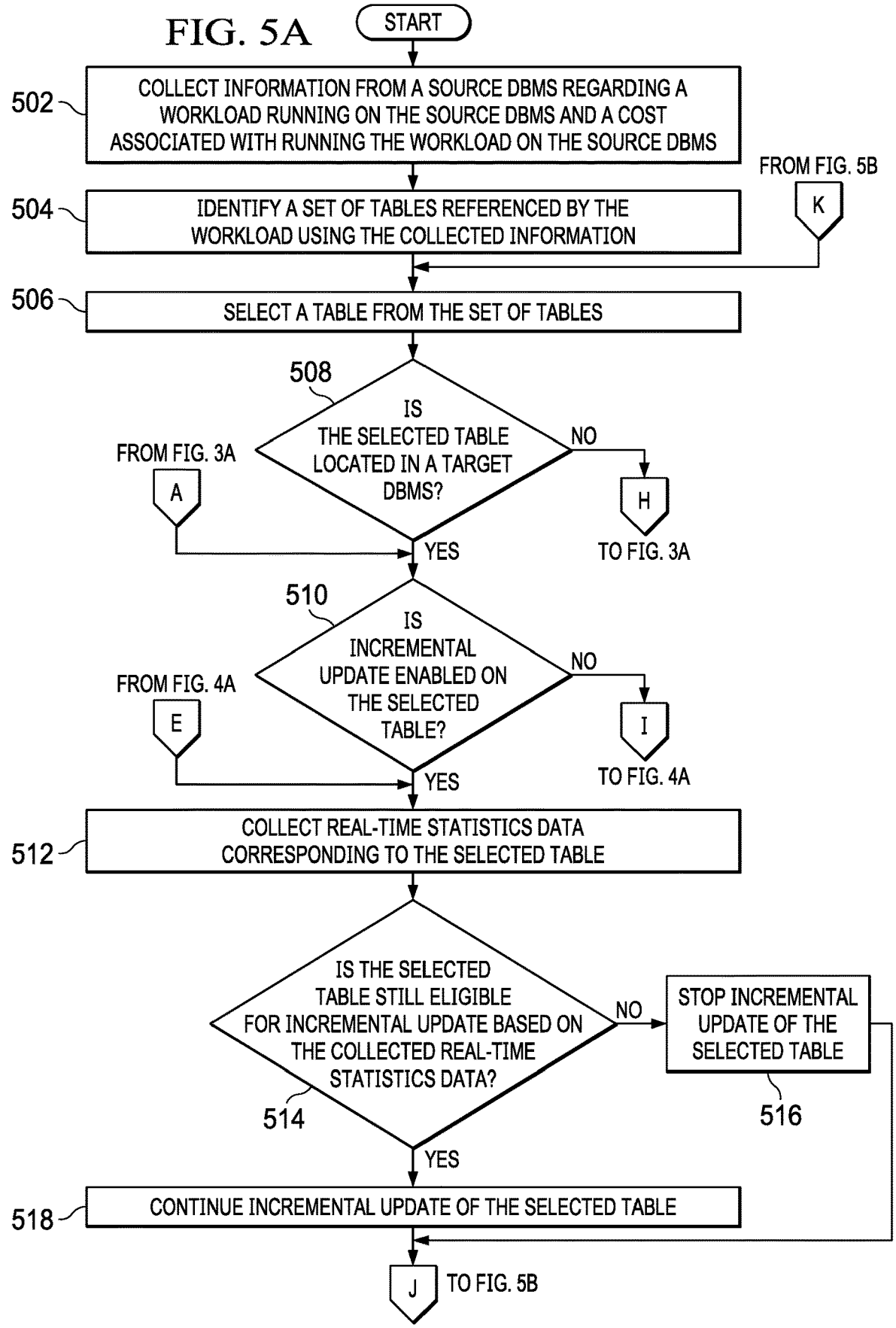

AUTOMATICALLY OPTIMIZING RESOURCE USAGE ON A TARGET DATABASE MANAGEMENT SYSTEM TO INCREASE WORKLOAD PERFORMANCE

BACKGROUND

1. Field

The disclosure relates generally to database management systems and more specifically to automatically optimizing computer memory and central processing unit resources used by a target database management system to increase accelerated analytical query workload performance.

2. Description of the Related Art

A database is an organized collection of data. A database management system (DBMS) is system software for creating and managing a database. A DBMS makes it possible for users to create, read, update and delete data in a database. In other words, a DBMS serves as an interface between a database and users or applications and ensures that data is consistently organized and remains easily accessible.

A DBMS manages the data, the database engine that allows the data to be accessed, and the database schema that defines the database's logical structure. These elements help provide concurrency, security, data integrity, and uniform administration procedures. Typical database administration tasks supported by the DBMS include change management, performance monitoring, and backup and recovery. Many database management systems (DBMSs) also may perform automated rollbacks, restarts and recovery, and logging of activity.

In a relational DBMS, records are stored in tables. Records are often referred to as rows, and record attributes are called columns. A database is not generally portable across different DBMSs, but different DBMSs can interoperate by using standards, such as, for example, Structured Query Language (SQL), Open Database Connectivity (ODBC), or Java Database Connectivity (JDBC), to allow a single application to work with more than one DBMS.

Technology advancements have resulted in growing amounts of data in all areas. To gain valuable insights, users demand the capability of performing real-time analytics on large amounts of data within particular areas. However, real-time data analytics require expensive query operations that are very time consuming on central processing units (CPUs). Additionally, in traditional DBMSs, CPU resources are typically dedicated to transactional workloads instead of analytical workloads.

SUMMARY

According to one illustrative embodiment, a computer-implemented method for loading a set of data into a target database management system (DBMS) from a source DBMS to increase workload performance and decrease resource usage is provided. A computer, using a size and a change rate of tables eligible to be offloaded to the target DBMS, determines a total central processor unit (CPU) cost corresponding to loading the set of data into to the target DBMS and workload cost savings corresponding to executing one or more workloads on the target DBMS based on a set of one or more load strategies. The computer compares the total CPU cost with the workload cost savings of each load strategy in the set of load strategies. The computer selects an optimal load strategy from the set of load strategies based on comparing the total CPU cost with the workload cost savings of each load strategy. The computer automatically loads the set of data into to the target DBMS from the source DBMS in accordance with the selected optimal load strategy for accelerated execution of the one or more workloads increasing workload performance and decreasing CPU cost. According to other illustrative embodiments, a computer system and computer program product for loading a set of data into a target DBMS from a source DBMS to increase workload performance and decrease resource usage are provided.

According to further illustrative embodiments, the computer collects information regarding a set of workloads running on the target DBMS and a cost associated with running each respective workload on the target DBMS. The computer acquires a size of a set of tables in the target DBMS and a reference count associated with each table in the set based on usage by the set of workloads. The computer evaluates a frequency of table access by the set of workloads for each table in the set of tables in the target DBMS. The computer maps the frequency of table access associated with each table referenced by the set of workloads to a memory and CPU cost savings associated with removing tables with minimal or no frequency of access from the target DBMS to identify table remove candidates. The computer automatically removes the identified table remove candidates from the target DBMS based on the mapping to decrease memory usage and increase workload performance on the target DBMS.

Therefore, illustrative embodiments calculate a cost/benefit balance for each table by comparing CPU cost savings for offloading workloads referencing each of the tables and the CPU cost incurred by loading data onto each of the tables on the target DBMS. In addition, illustrative embodiments remove tables that are unused or minimally used on the target DBMS. Consequently, illustrative embodiments optimize memory and CPU usage to increase workload performance.

BRIEF DESCRIPTION OF THE DRAWINGS

FIGS. 5A-5B are a flowchart illustrating a process for evaluating tables enabled for incremental update of table data in accordance with an illustrative embodiment;

DETAILED DESCRIPTION

Figure 1:
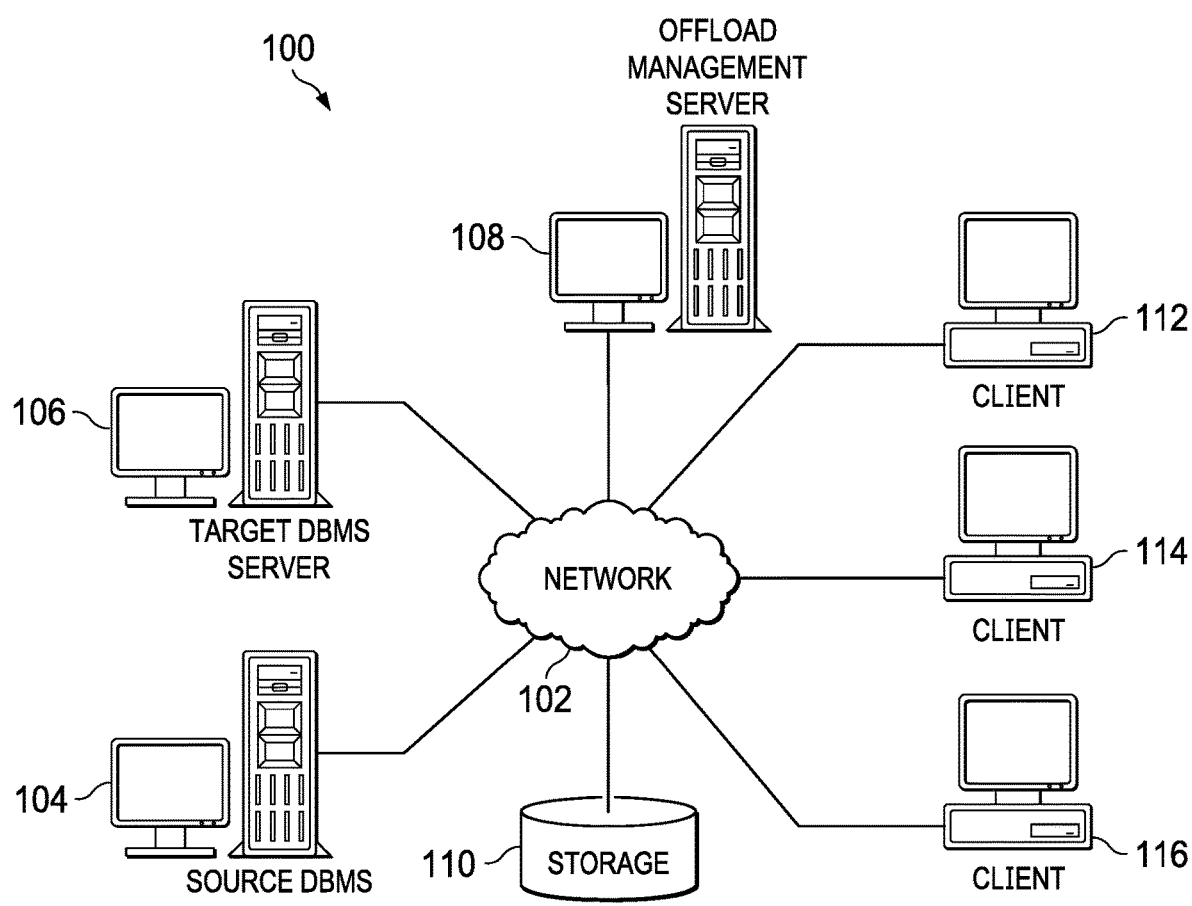
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
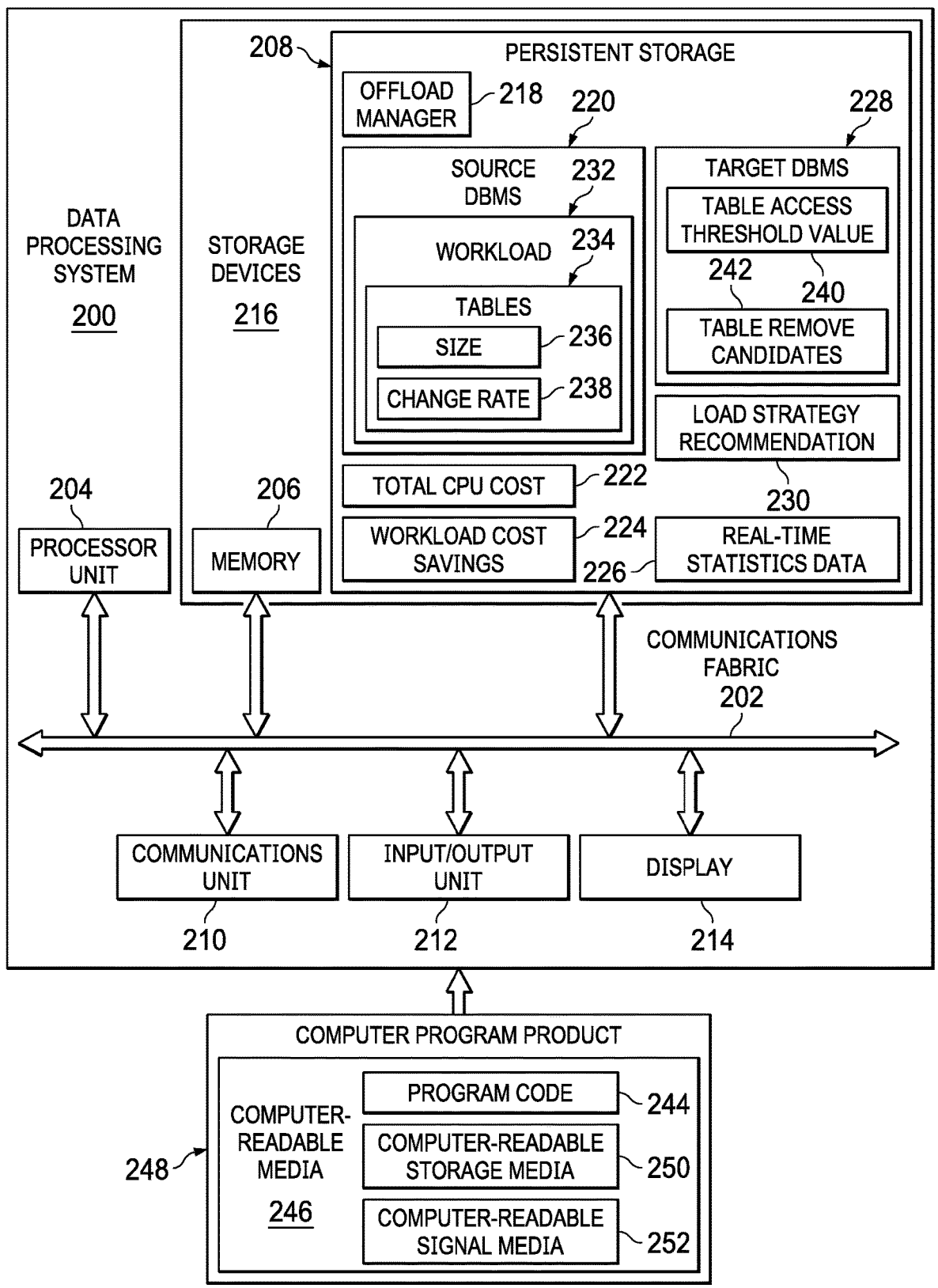
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104, server 106, and server 108 connect to network 102, along with storage 110. Server 104, server 106, and server 108 may be, for example, server computers with high-speed connections to network 102. In addition, server 104 is a source DBMS server, server 106 is a target DBMS server, and server 108 is an offload management server. It should be noted that source DBMS server 104, target DBMS server 106, and offload management server 108 may each represent a set of one or more computers. Further, DBMS server 104, target DBMS server 106, and offload management server 108 may be computers in a data center. Alternatively, DBMS server 104, target DBMS server 106, and offload management server 108 may be computing nodes in a cloud environment.

Source DBMS server 104 represents a relational database that stores data in tables and is a source for requests for that data. In other words, source DBMS server 104 services queries corresponding to that data from client devices. The data may be any type of data. Target DBMS server 106 represents an accelerator for accelerating queries for data contained on source DBMS server 104 and comprises a relational database of tables. Offload manager server 108 controls the process of offloading query workloads from source DBMS server 104 to target DBMS server 106.

Offload manager server 108 determines a balance between resource cost and resource cost savings for each table referenced by a query workload by comparing CPU cost savings for offloading from source DBMS server 104 the query workload referencing each of the tables and the CPU cost incurred by loading data into each of the referenced tables on the target DBMS. In addition, offload manager server 108 removes tables that are not referenced or minimally referenced (e.g., number of references corresponding to a particular table is below a defined threshold number of references) from target DBMS 106 to free up memory on target DBMS 106. Thus, offload manager server 108 optimizes the memory and CPU usage by target DBMS 106 to increase accelerated analytical query workload performance.

Client 112, client 114, and client 116 also connect to network 102. Clients 112, 114, and 116 are clients of source DBMS server 104. Users of clients 112, 114, and 116 may utilize clients 112, 114, and 116 to query source DBMS server 104 for data. The query may be, for example, an analytical query requiring increased CPU usage in source DBMS server 104. In this example, clients 112, 114, and 116 are shown as desktop or personal computers with wire communication links to network 102. However, it should be noted clients 112, 114, and 116 may represent other types of data processing systems, such as, for example, network computers, laptop computers, handheld computers, smart phones, smart watches, smart televisions, gaming devices, kiosks, and the like, with wire or wireless communication links to network 102.

Storage 110 represents a network storage device capable of storing any type of data in a structured format or an unstructured format. In addition, storage 110 may represent a plurality of network storage devices. Storage 110 may store, for example, identifiers and network addresses for a plurality of source DBMS servers, identifiers and network addresses for a plurality of target DBMS servers, identifiers and network addresses for a plurality of client devices, real-time database statistics, and the like. Further, storage 110 may store other types of data, such as authentication or credential data that may include user names, passwords, and biometric data associated with client device users and system administrators, for example.

In addition, it should be noted that network data processing system 100 may include any number of additional servers, client devices, storage devices, and other devices not shown. Program code located in network data processing system 100 may be stored on a computer readable storage medium and downloaded to a computer or other data processing device for use. For example, program code may be stored on a computer readable storage medium on source DBMS server 104 and downloaded to client 112 over network 102 for use on client 112.

In the depicted example, network data processing system 100 may be implemented as a number of different types of communication networks, such as, for example, an internet, an intranet, a local area network (LAN), a wide area network (WAN), or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as offload management server 108 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware CPU devices or may be a multi-processor core, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores offload manager 218. However, it should be noted that even though offload manager 218 is illustrated as residing in persistent storage 208, in an alternative illustrative embodiment offload manager 218 may be a separate component of data processing system 200. For example, offload manager 218 may be a hardware component coupled to communication fabric 202 or a combination of hardware and software components. In another alternative illustrative embodiment, a first portion of offload manager 218 may be located on data processing system 200 and a second portion of offload manager 218 may be located on a second data processing system, such as, target DBMS server 106 in FIG. 1. In yet another alternative illustrative embodiment, offload manager 218 may be located in the target DBMS server instead of, or in addition to, data processing system 200.

Offload manager 218 controls the process of offloading long running analytical query workloads from a source DBMS, such as, for example, source DBMS server 104 in FIG. 1, to a target DBMS, such as, for example, target DBMS server 106 in FIG. 1. Offload manager 218 determines savings in CPU workload cost by running the workload on the target DBMS as opposed to the source DBMS and the CPU cost corresponding to load of the data into tables referenced by the workload on the target DBMS. Offload manager 218 also determines which already loaded tables on the target DBMS can be removed saving memory resources of the target DBMS and increasing workload performance on the target DBMS.

In this example, persistent storage 208 also stores source DBMS 220, total CPU cost 222, workload cost savings 224, real-time statistics data 226, target DBMS 228, and load strategy recommendation 230. Source DBMS 220 represents an identifier and network address of the source DBMS. Offload manager 218 uses the identifier and network address to connect to and acquire information corresponding to the source DBMS. The information may include, for example, workload 232. Workload 232 represents a set of one or more workloads running on the source DBMS. Workload 232 may be, for example, an analytical query requiring increased CPU usage on the source DBMS. Tables 234 represent a set of tables referenced by the source DBMS to perform workload 232. Size 236 represents a size of each respective table in the set of tables referenced for workload 232. Change rate 238 represents a frequency of modification of each respective table in the set of tables referenced for workload 232.

Offload manger 218 utilizes size 236 and change rate 238 to calculate total CPU cost 222 corresponding to workload 232. Total CPU cost 222 represents an aggregate CPU usage cost for loading tables 234 onto a target DBMS to perform workload 232 on the target DBMS. Workload cost savings 224 represent a reduction in CPU usage by offloading workload 232 from the source DBMS to the target DBMS.

Real-time statistics data 226 represent current real-time information, such as size, change rate, errors, and the like, corresponding to tables 234. Target DBMS 228 represents an identifier and network address of the target DBMS. Offload manager 218 uses the identifier and network address to connect to and acquire information corresponding to the target DBMS.

Table access threshold value 240 represents a predefined minimum number of references or accesses to tables loaded onto the target DBMS. Offload manager 218 identifies tables with a corresponding number of accesses less than or equal to table access threshold value 240 as table remove candidates 242. Table remove candidates 242 represent a set of one or more tables that offload manager 218 may remove from the target DBMS to increase memory and, therefore, workload performance on the target DBMS.

Load strategy recommendation 230 represents a table load plan that offload manager 218 may utilize to load data onto tables of the target DBMS. Load strategy recommendation 230 may be, for example, an UNLOAD-based refresh strategy and/or an incremental update strategy. The UNLOAD-based refresh strategy updates table partitions and entire tables referenced by the workload on the target DBMS at a specific point in time. The incremental update strategy constantly updates data on tables referenced by the workload on the target DBMS.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 244 is located in a functional form on computer readable media 246 that is selectively removable and may be loaded onto or transferred to data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to data processing system 200. In some instances, computer readable storage media 250 may not be removable from data processing system 200.

Alternatively, program code 244 may be transferred to data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 244 may be downloaded over a network to persistent storage 208 from another device or data processing system through computer readable signal media 252 for use within data processing system 200. For instance, program code stored in a computer readable storage media in a data processing system may be downloaded over a network from the data processing system to data processing system 200. The data processing system providing program code 244 may be a server computer, a client computer, or some other device capable of storing and transmitting program code 244.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 250 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

An accelerator is used for offloading long running analytical queries to be accelerated. In order for a query to be accelerated, data for the tables referenced by the query need to be loaded into the accelerator. When multiple such queries are offloaded to the accelerator, memory consumption increases, while query performance decreases.

Resource restrictions, such as CPU, memory, and persistent storage, demand highly optimized resource usage by the accelerator to enhance accelerated query performance. In many cases, unlimited offloading of table data into system hardware used by the accelerator, consumes more system resources than necessary. As a result, intelligent table loading and unloading of table data will improve workload or query performance.

Currently, a workload tuner provides suggestions on which tables and data, when offloaded to an accelerator yields improved performance. However, the workload tuner provides recommendations based on query statistics only. In other words, the workload tuner depends on how the query workload under consideration is derived. If the queries that are part of the workload are coming from the Statement cache, the real cost of running the query on a DBMS is known.

However, when the workload tuner proposes query tuning insights by suggesting tables to offload to the accelerator, the real CPU usage cost for loading the data into the accelerator is not considered. Over time, as data for multiple tables are loaded into the accelerator, memory resources utilized by the accelerator also get used up decreasing performance.

Illustrative embodiments load data into tables of a target DBMS (i.e., an accelerator) by taking into account the CPU usage cost for loading data into each table referenced by a workload to be offloaded from a source DBMS. Thus, illustrative embodiments calculate a "cost/benefit balance" for each table by comparing CPU cost savings for offloading workloads/queries referencing each of the tables and the CPU cost incurred by loading data onto each of the tables on the target DBMS. Further, illustrative embodiments provide recommendations to remove data (i.e., tables) that are unused or minimally used by the target DBMS. Consequently, illustrative embodiments provide system resource optimization by optimizing memory and CPU resources used by the target DBMS to increase accelerated analytical workload/query performance.

Illustrative embodiments provide a computer-implemented method for optimizing a data loading strategy from a source DBMS into a target DBMS, which contains a subset of the source DBMS data set. The target DBMS uses the subset of data to run one or more workloads (e.g., analytical queries). Illustrative embodiments collect information regarding workloads hitting the source DBMS, costs corresponding to running the workloads on the source DBMS, tables referenced by the workloads, and eligibility of the tables referenced by the workloads to be offloaded to the target DBMS. Illustrative embodiments acquire a size of the tables eligible to be offloaded to the target DBMS. In addition, illustrative embodiments evaluate a change rate of the tables eligible to be offloaded to the target DBMS. Illustrative embodiments, using the size and the change rate of the tables eligible to be offloaded to the target DBMS, determine a total CPU cost corresponding to loading the subset of data into to the target DBMS and workload cost savings corresponding to executing one or more of the workloads on the target DBMS based on a set of one or more load strategies. The determined workload cost savings for a particular table include predicted future workloads corresponding to that particular table. Illustrative embodiments compare the total CPU cost with the workload cost savings of each load strategy in the set of load strategies. Illustrative embodiments select an optimal load strategy from the set of load strategies based on comparing the total cost with the workload cost savings of each load strategy. Illustrative embodiments automatically enforce loading of the subset of data into to the target DBMS in accordance with the selected optimal load strategy for accelerated execution of the one or more workloads.

Moreover, illustrative embodiments provide a computer-implemented method for optimizing a data removal strategy corresponding to the target DBMS resulting in accelerated workload performance. Illustrative embodiments collect information regarding a set of workloads running on the target DBMS and a cost associated with running each respective workload on the target DBMS. Illustrative embodiments acquire a size of each table in a set of tables in the target DBMS and a reference count associated with each table in the set based on usage by the set of workloads. Illustrative embodiments evaluate a frequency of table access by the set of workloads for each table in the set of tables in the target DBMS. Illustrative embodiments map the frequency of table access associated with each table referenced by the set of workloads to a memory and CPU cost savings associated with removing tables with minimal or no frequency of access from the target DBMS to identify table remove candidates. Illustrative embodiments automatically remove the identified table remove candidates from the target DBMS based on the mapping.

Accelerators (i.e., target DBMSs) are particularly suited for quickly performing database workloads of a particular type (e.g., analytical queries). Illustrative embodiments copy all or a portion of data from a source database into a target database to increase workload (e.g., query) performance. Illustrative embodiments dynamically determine whether a query received by a source database is executed in the source database or is offloaded to the target database. Whether illustrative embodiments offload a query to a target database or not, depends on the type of workload (e.g., analytical query workload). Illustrative embodiments will dispatch a workload to the target database when illustrative embodiments determine or predict that the workload will be executed faster on the target database rather than on the original data tables in the source database. Thus, illustrative embodiments utilize the target database to accelerate workload/query execution.

Previous methods of loading and unloading data into a target database has always been a manual process, which was left to the best judgement of a database administrator. Although some best practices were noted, previous methods had no way to support the database administrator in making decisions on the data load and unload strategy.

Organization of data in the source DBMS may vary between tables. Some tables being non-partitioned tables and some tables partitioned by range or growth. The change rate for the data in these tables also greatly varies based on the table purpose. Thus, a need exists for a process that will recommend and enforce the most optimal load strategy.

Illustrative embodiments ingest information regarding savings in workload cost by running the workload on a target DBMS as opposed to the source DBMS and CPU cost corresponding to initial load for the data into the tables referenced on the target DBMS. Then, illustrative embodiments determine a rate of change for data in these tables and calculate the CPU cost associated with the different loading strategies that could be employed for a given table. With this information ingested and calculated, illustrative embodiments present a user (e.g., database administrator) with the real cost, which includes workload performance savings on the target DBMS and cost associated with loading data onto tables of the target DBMS, and the recommended/selected load strategy, which includes rationale to minimize any associated data load overhead. Illustrative embodiments also automatically carry out the load operation on the target DBMS using the recommended/selected load strategy.

Illustrative embodiments collect data regarding savings in workload cost by running the workload on the target DBMS when a parameter is set to yes, for example. Given a particular workload, illustrative embodiments determine the workload cost of directly running the workload on the source DBMS and recommend running the workload on the target DBMS in response to illustrative embodiments determining that the workload cost will be decreased when running the workload on the target DBMS. Thus, illustrative embodiments base the recommendation on workload cost savings. Illustrative embodiments fetch, from the source DBMS catalog tables, information regarding a size of each of the tables referenced by the workload and eligibility for load onto the target DBMS.

There are 2 types of data load/refresh strategies that illustrative embodiments may perform to synchronize data on the target DBMS namely, an UNLOAD-based refresh strategy and incremental update strategy. The UNLOAD-based refresh strategy updates table partitions and entire tables at a specific point in time. The UNLOAD-based refresh function takes a snapshot of the data on the source DBMS and transfers the data to the target DBMS. The incremental update strategy constantly updates the data on the target DBMS by applying changes recorded in the source DBMS log. The total CPU cost associated with loading data onto tables of the target DBMS from the source DBMS varies based on the selected load strategy.

The CPU cost for data synchronization in either incremental updates or UNLOAD-based refreshes depends on the total size of the data to be transferred to the target DBMS. In the case of incremental updates, the total size of the data to be transferred is the net volume of changes in bytes that were applied to the tables in the source DBMS. For the UNLOAD-based refresh, the total size of the data to be transferred depends on the number and the size of the partitions that have changed because only entire partitions can be refreshed. Since the incremental update function reads the log of an entire source DBMS subsystem, an estimate of the CPU cost must be based on the overall activity that was recorded in the log of this subsystem. In-scope and out-of-scope changes must be distinguished. In-scope changes denote log activity that is relevant to incrementally updated tables on the target DBMS, while out-of-scope changes denote all other activities. The CPU cost of data load using UNLOAD-based refresh is a function of the number of rows changed and an average row length of the subject table. For incremental update, when the source DBMS needs to be scanned, the CPU cost of data refresh is a function of average row length of the subject table, number of inserts, updates, and deletes, and time associated with filtering out-of-scope changes.

Currently a user calculates and manually performs steps to transfer each referenced table under consideration, which is both time consuming and error prone thus making this current process suboptimal. This is part of the problem that illustrative embodiments take into account and address by including logic to automate calculation of multiple factors and integrating the results to generate concrete cost data along with recommendations. In addition, illustrative embodiments have an ability to take actions automatically based on the generated recommendations.

Figure 3A:
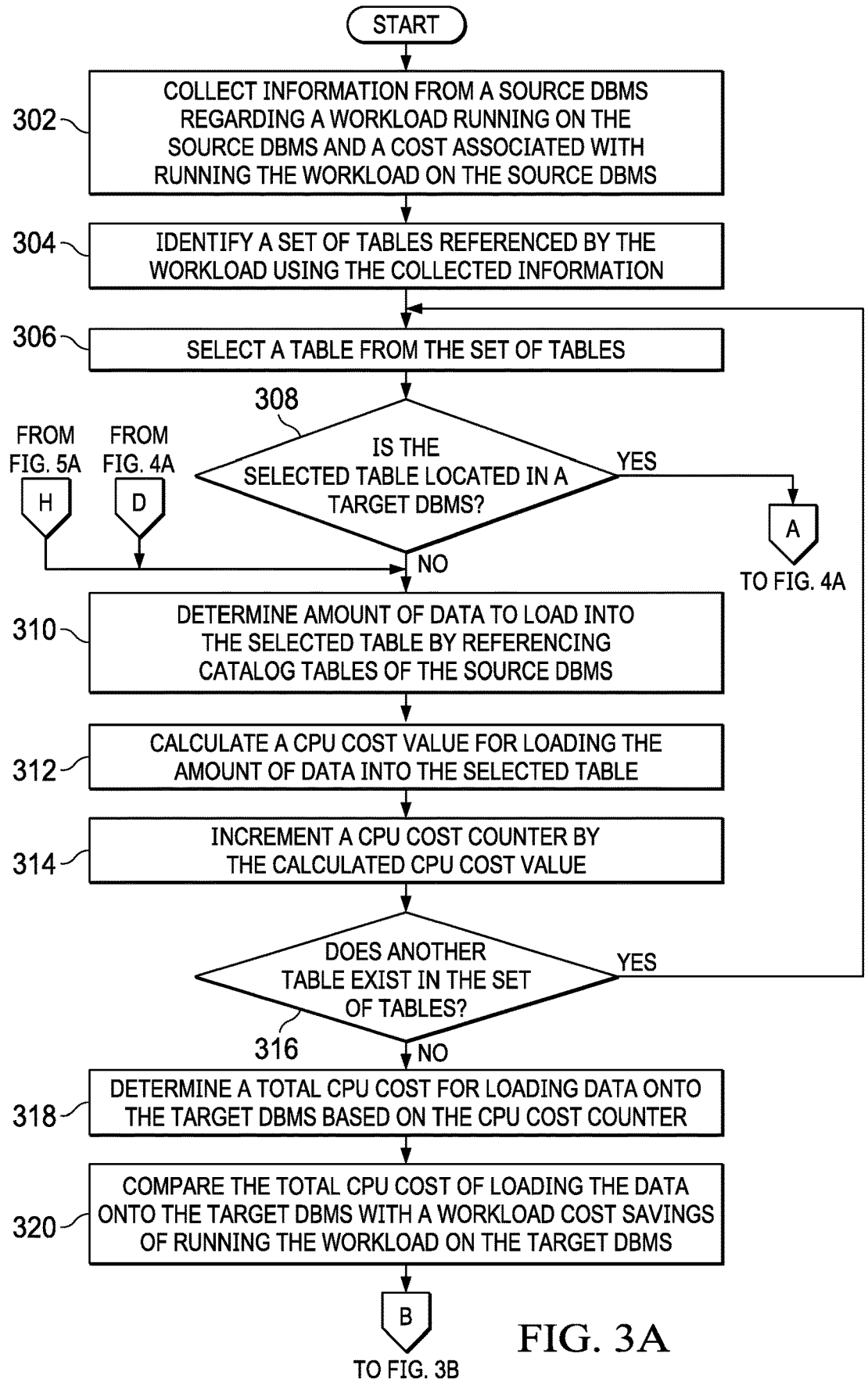
FIGS. 3A-3B are a flowchart illustrating a process for initially loading table data in accordance with an illustrative embodiment.
Figure 3B:
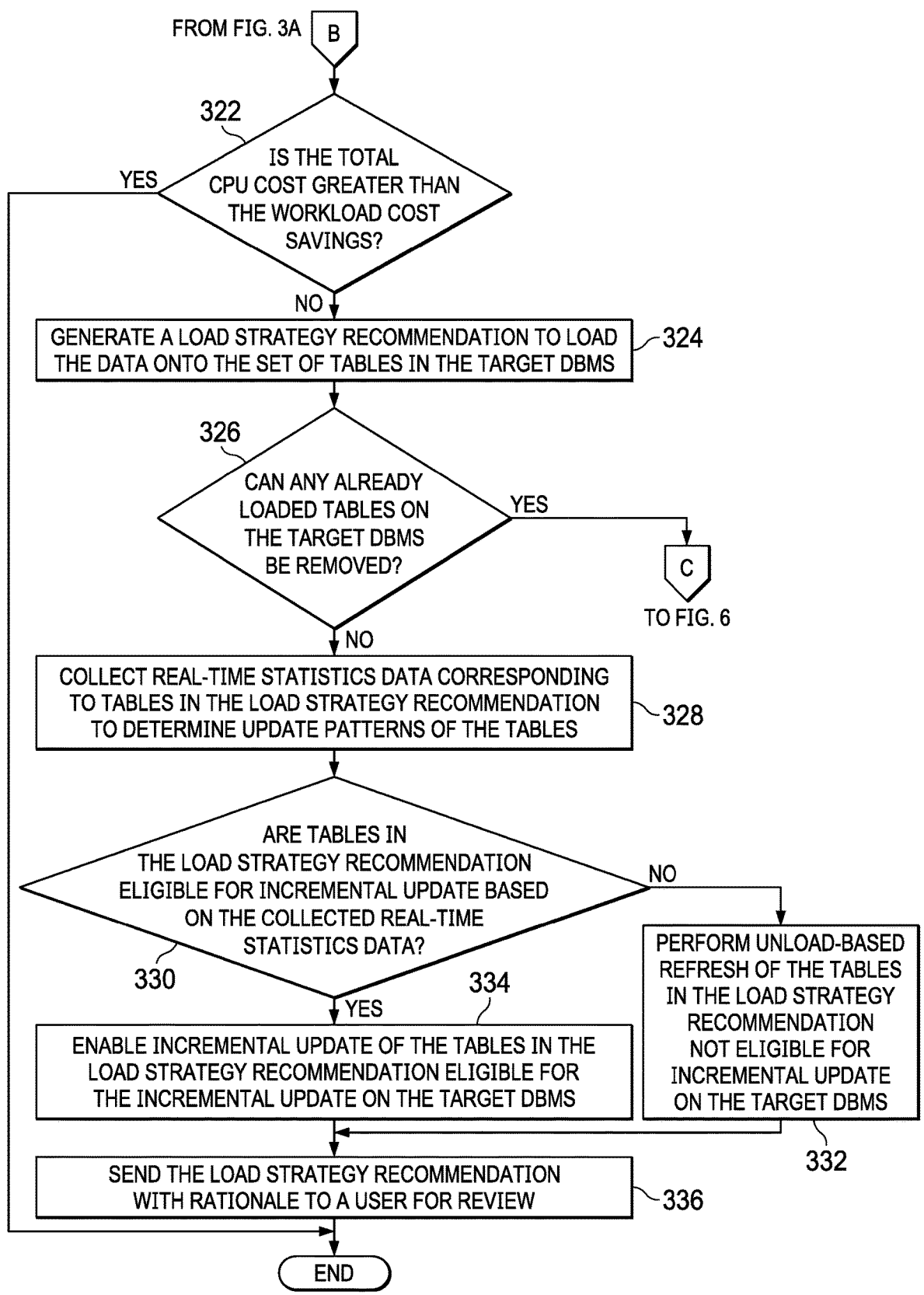

With reference now to FIGS. 3A-3B, a flowchart illustrating a process for initially loading table data is shown in accordance with an illustrative embodiment. In this process, the workload/query cost savings by running the workload/query on a target DBMS are available, but table data needed for enabling the workload/query to run on the target DBMS are not yet available. The process shown in FIGS. 3A-3B may be implemented in a computer, such as, for example, offload manager server 108 in FIG. 1 or data processing system 200 in FIG. 2.

The process begins when the computer collects information from a source DBMS regarding a workload running on the source DBMS and a cost associated with running the workload on the source DBMS (step 302). This is performed by generating the execution plan of the workload against the source DBMS. The source DBMS may be, for example, source DBMS server 104 in FIG. 1. Afterward, the computer identifies a set of tables referenced by the workload using the collected information (step 304).

Subsequently, the computer selects a table from the set of tables (step 306). The computer makes a determination as to whether the selected table is located in a target DBMS (step 308). The target DBMS may be, for example, target DBMS server 106 in FIG. 1. If the computer determines that the selected table is located in the target DBMS, yes output of step 308, then the process proceeds to step 410 in FIG. 4. If the computer determines that the selected table is not located in the target DBMS, no output of step 308, then the computer determines an amount of data to initially load into the selected table by referencing catalog tables of the source DBMS (step 310).

In addition, the computer calculates a CPU cost value for loading the amount of data into the selected table (step 312). The computer also increments a CPU cost counter by the calculated CPU cost value (step 314). Afterward, the computer makes a determination as to whether another table exists in the set of tables (step 316). If the computer determines that another table does exist in the set of tables, yes output of step 316, then the process returns to step 306 where the computer selects another table from the set of tables. If the computer determines that another table does not exist in the set of tables, no output of step 316, then the computer determines a total CPU cost for loading data onto the target DBMS based on the CPU cost counter (step 318).

The computer compares the total CPU cost of loading the data onto the target DBMS with a workload cost savings of running the workload on the target DBMS (step 320). Furthermore, the computer takes into account future workload cost savings by loading table data into the target DBMS. In response to the computer comparing the total CPU cost with the workload cost savings, the computer makes a determination as to whether the total CPU cost is greater than the workload cost savings (step 322). If the computer determines that the total CPU cost is greater than the workload cost savings, yes output of step 322, then the process terminates thereafter. If the computer determines that the total CPU cost is less than the workload cost savings, no output of step 322, then the computer generates a load strategy recommendation to load the data onto tables of the target DBMS (step 324). The process of generating a load strategy recommendation is explained in more detail in the description of FIG. 7 below.

Further, the computer makes a determination as to whether any already loaded tables on the target DBMS can be removed (step 326). If the computer determines that already loaded tables on the target DBMS can be removed, yes output of step 326, then the process proceeds to step 602 in FIG. 6. If the computer determines that already loaded tables on the target DBMS cannot be removed, no output of step 326, then the computer collects real-time statistics data corresponding to tables in the load strategy recommendation to determine update patterns of the tables (step 328).

Afterward, the computer makes a determination as to whether tables in the load strategy recommendation are eligible for incremental update based on the collected real-time statistics data (step 330). If the computer determines that tables in the load strategy recommendation are not eligible for incremental update based on the collected real-time statistics data, no output of step 330, then the computer performs an unload-based refresh of the tables in the load strategy recommendation not eligible for incremental update on the target DBMS (step 332). If the computer determines that tables in the load strategy recommendation are eligible for incremental update based on the collected real-time statistics data, yes output of step 330, then the computer enables incremental update of the tables in the load strategy recommendation eligible for the incremental update on the target DBMS (step 334). Moreover, the computer sends the load strategy recommendation with rationale to a user for review (step 336). Thereafter, the process terminates.

Figure 4A:
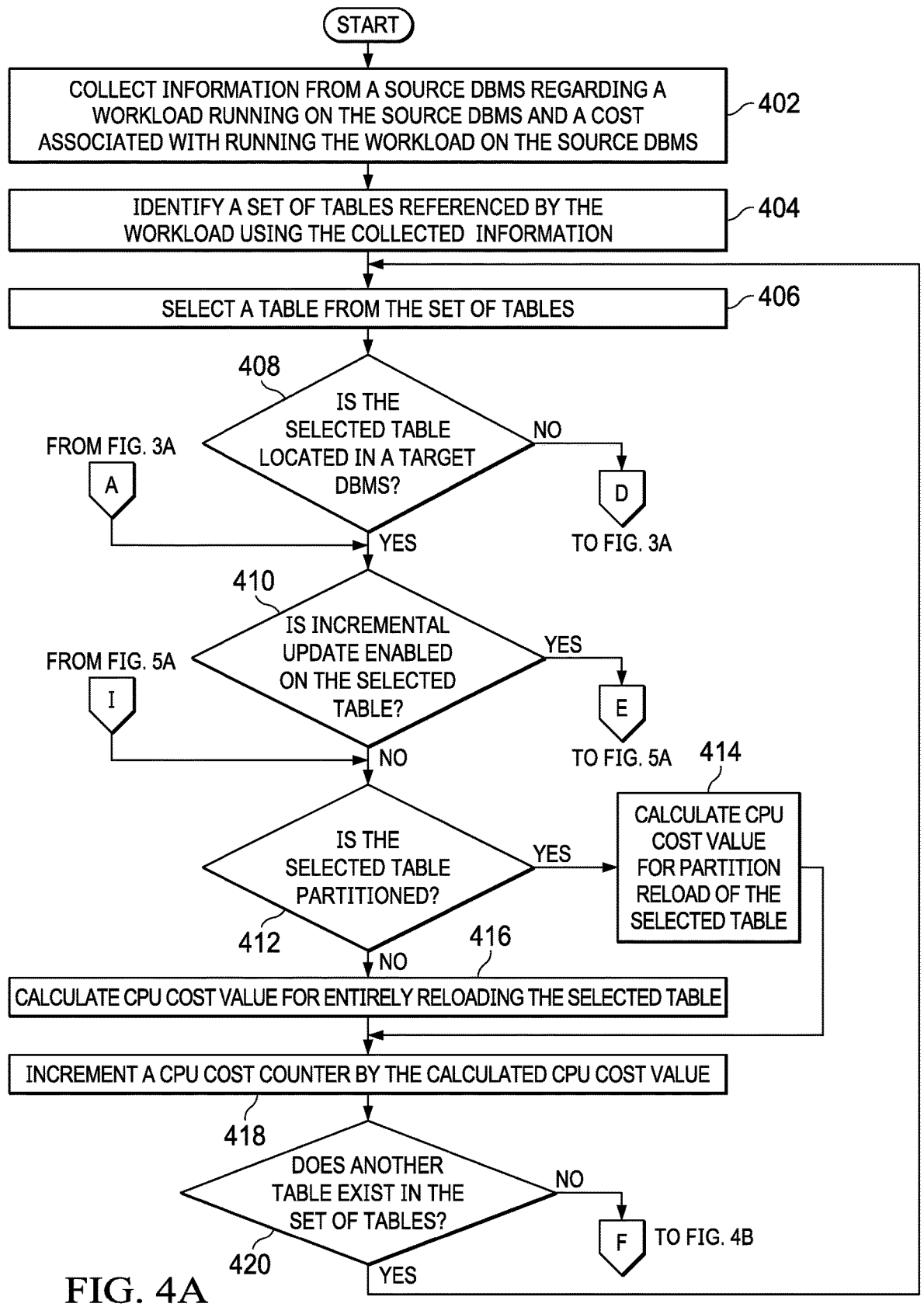
FIGS. 4A-4B are a flowchart illustrating a process for refreshing data of partitioned tables in accordance with an illustrative embodiment.
Figure 4B:
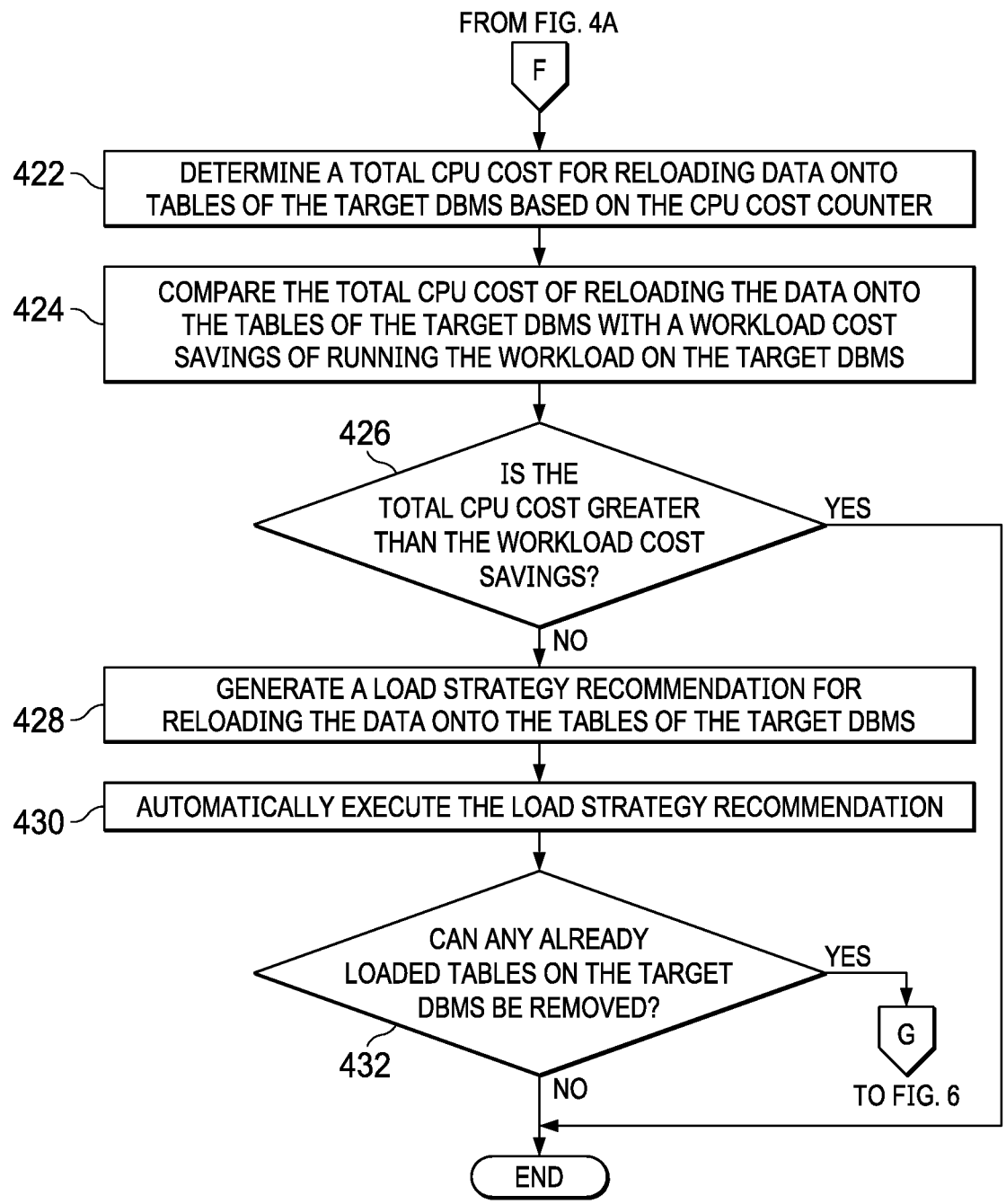

With reference now to FIGS. 4A-4B, a flowchart illustrating a process for refreshing data of partitioned tables is shown in accordance with an illustrative embodiment. In this process, the workload cost savings by running the workload on a target DBMS are available and the table data required for running the workload on the target DBMS need to be refreshed. The process shown in FIGS. 4A-4B may be implemented in a computer, such as, for example, offload manager server 108 in FIG. 1 or data processing system 200 in FIG. 2.

The process begins when the computer collects information from a source DBMS regarding a workload running on the source DBMS and a cost associated with running the workload on the source DBMS (step 402). The computer identifies a set of tables referenced by the workload using the collected information (step 404). The computer selects a table from the set of tables (step 406).

The computer makes a determination as to whether the selected table is located in a target DBMS (step 408). If the computer determines that the selected table is not located in the target DBMS, no output of step 408, then the process returns to step 310 of FIG. 3A. If the computer determines that the selected table is located in the target DBMS, yes output of step 408, then the computer makes a determination as to whether incremental update is enabled on the selected table (step 410). If the computer determines that incremental update is enabled on the selected table, yes output of step 410, then the process proceeds to step 512 of FIG. 5A. If the computer determines that incremental update is not enabled on the selected table, no output of step 410, then the computer makes a determination as to whether the selected table is partitioned (step 412).

If the computer determines that the selected table is partitioned, yes output of step 412, then the computer calculates a CPU cost value for partition reload of the selected table (step 414). The computer may utilize, for example, a SYSPROC.ACCEL_LOAD_TABLES stored procedure to identify which partitions were changed since last load/refresh when table data were previously loaded into the target DBMS. Thereafter, the process proceeds to step 418. If the computer determines that the selected table is not partitioned, no output of step 412, then the computer calculates a CPU cost value for entirely reloading the selected table (step 416).

Afterward, the computer increments a CPU cost counter by the calculated CPU cost value (step 418). In addition, the computer makes a determination as to whether another table exists in the set of tables (step 420). If the computer determines that another table does exist in the set of tables, yes output of step 420, then the process returns to step 406 where the computer selects another table in the set of tables. If the computer determines that another table does not exist in the set of tables, no output of step 420, then the computer determines a total CPU cost for reloading data onto tables of the target DBMS based on the CPU cost counter (step 422).

The computer compares the total CPU cost of reloading the data onto the tables of the target DBMS with a workload cost savings of running the workload on the target DBMS (step 424). In response to the computer comparing the total CPU cost with the workload cost savings, the computer makes a determination as to whether the total CPU cost is greater than the workload cost savings (step 426). If the computer determines that the total CPU cost is greater than the workload cost savings, yes output of step 426, then the process terminates thereafter. If the computer determines that the total CPU cost is less than the workload cost savings, no output of step 426, then the computer generates a load strategy recommendation for reloading the data onto the tables of the target DBMS (step 428).

Further, the computer automatically executes the load strategy recommendation (step 430). Furthermore, the computer makes a determination as to whether any already loaded tables on the target DBMS can be removed (step 432). If the computer determines that already loaded tables on the target DBMS can be removed, yes output of step 432, then the process proceeds to step 602 of FIG. 6. If the computer determines that already loaded tables on the target DBMS cannot be removed, no output of step 432, then the process terminates thereafter.

Figure 5B:
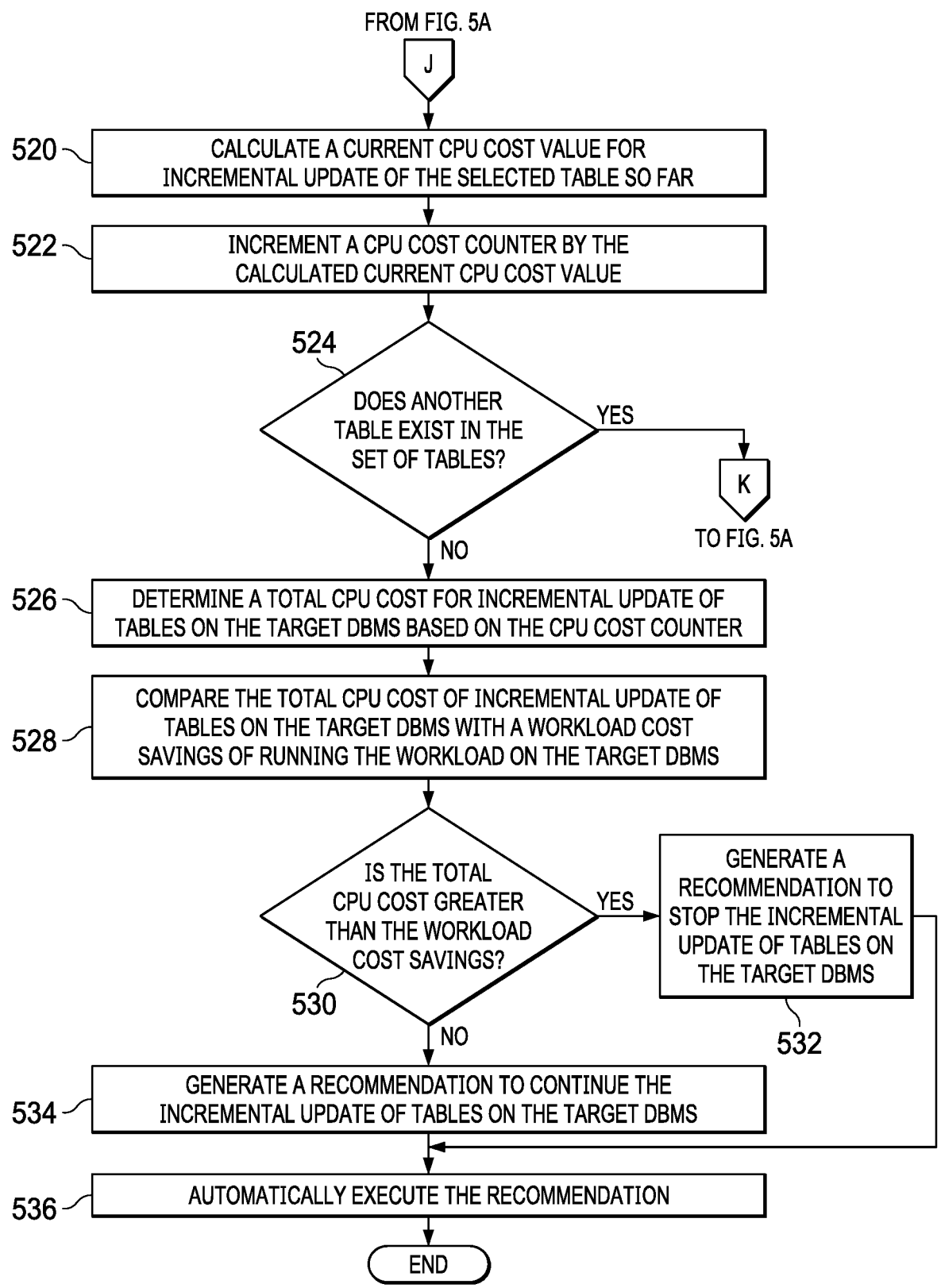

With reference now to FIGS. 5A-5B, a flowchart illustrating a process for evaluating tables enabled for incremental update of table data is shown in accordance with an illustrative embodiment. In this process, the workload cost savings by running the workload on a target DBMS are available and the table data required for running the workload on the target DBMS also are available and current since incremental update of tables is enabled. The process shown in FIGS. 5A-5B may be implemented in a computer, such as, for example, offload manager server 108 in FIG. 1 or data processing system 200 in FIG. 2.

The process begins when the computer collects information from a source DBMS regarding a workload running on the source DBMS and a cost associated with running the workload on the source DBMS (step 502). The computer identifies a set of tables referenced by the workload using the collected information (step 504). The computer selects a table from the set of tables (step 506).

The computer makes a determination as to whether the selected table is located in a target DBMS (step 508). If computer determines that the selected table is not located in the target DBMS, no output of step 508, then the process returns to step 310 of FIG. 3A. If computer determines that the selected table is located in the target DBMS, yes output of step 508, then the computer makes a determination as to whether incremental update is enabled on the selected table (step 510).

If the computer determines that incremental update is not enabled on the selected table, no output of step 510, then the process returns to step 412 of FIG. 4A. If the computer determines that incremental update is enabled on the selected table, yes output of step 510, then the computer collects real-time statistics data corresponding to the selected table (step 512). Afterward, the computer makes a determination as to whether the selected table is still eligible for incremental update based on the collected real-time statistics data (step 514).

If the computer determines that the selected table is not still eligible for incremental update based on the collected real-time statistics data, no output of step 514, then the computer stops the incremental update of the selected table (step 516). Thereafter, the process proceeds to step 520. If the computer determines that the selected table is still eligible for incremental update based on the collected real-time statistics data, yes output of step 514, then the computer continues the incremental update of the selected table (step 518).

The computer calculates a current CPU cost value for the incremental update of the selected table so far (step 520). In addition, the computer increments a CPU cost counter by the calculated current CPU cost value (step 522). Further, the computer makes a determination as to whether another table exists in the set of tables (step 524).

If the computer determines that another table does exist in the set of tables, yes output of step 524, then the process returns to step 506 where the computer selects another table in the set of tables. If the computer determines that another table does not exist in the set of tables, no output of step 524, then the computer determines a total CPU cost for incremental update of tables on the target DBMS based on the CPU cost counter (step 526).

The computer compares the total CPU cost of incremental update of tables on the target DBMS with a workload cost savings of running the workload on the target DBMS (step 528). In response to the computer comparing the total CPU cost with the workload cost savings, the computer makes a determination as to whether the total CPU cost is greater than the workload cost savings (step 530). If the computer determines that the total CPU cost is greater than the workload cost savings, yes output of step 530, then the computer generates a recommendation to stop the incremental update of tables on the target DBMS (step 532). Thereafter, the process proceeds to step 536. If the computer determines that the total CPU cost is less than the workload cost savings, no output of step 530, then the computer generates a recommendation to continue the incremental update of tables on the target DBMS (step 534). Moreover, the computer automatically executes the recommendation (step 536). Thereafter, the process terminates.

Figure 6:
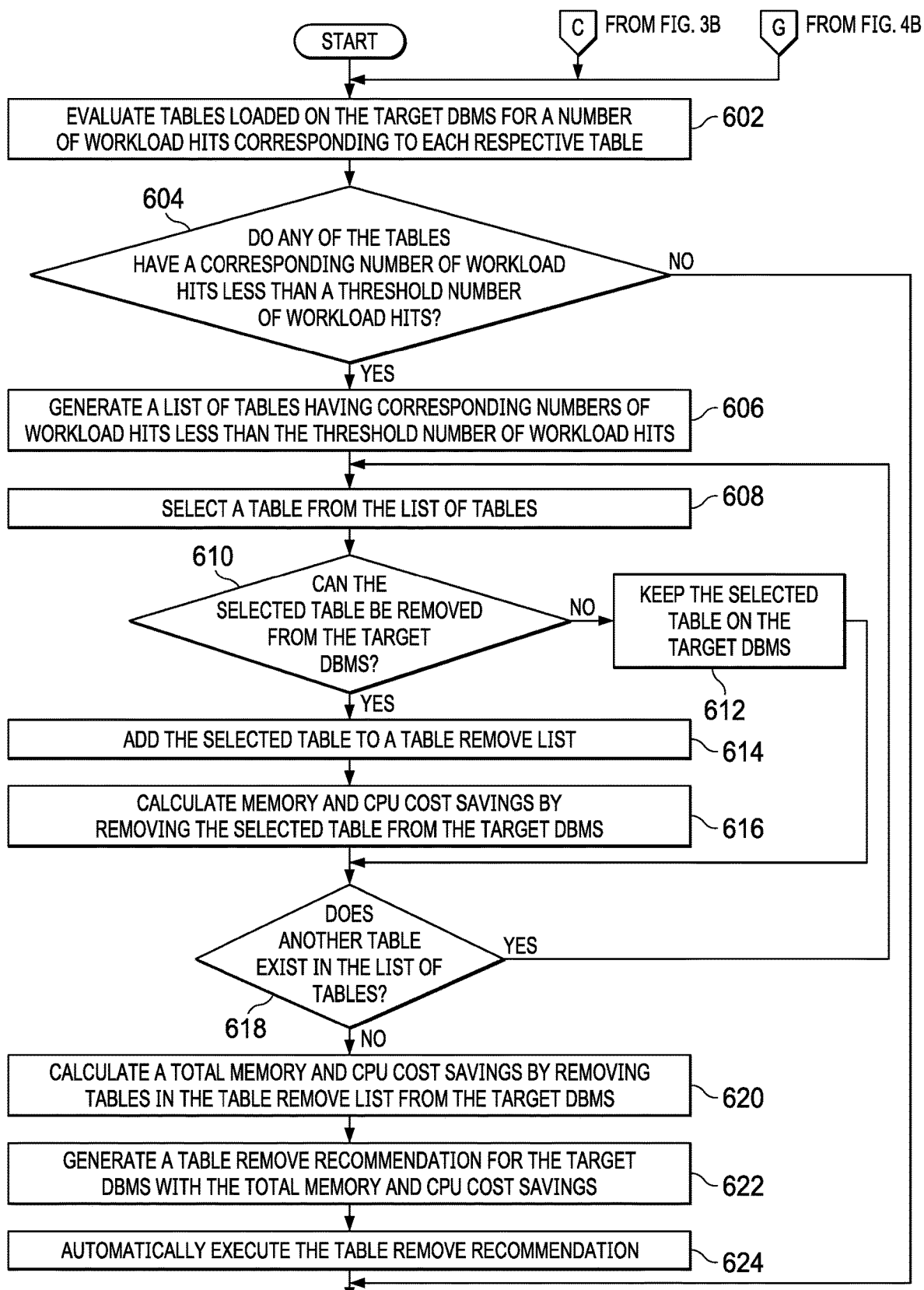
FIG. 6 is a flowchart illustrating a process for removing unreferenced or minimally referenced tables in accordance with an illustrative embodiment.

With reference now to FIG. 6, a flowchart illustrating a process for removing unreferenced or minimally referenced tables is shown in accordance with an illustrative embodiment. In this process, information regarding table data required to be loaded into a target DBMS to enable workload acceleration is available and the target DBMS needs to be checked for candidate tables that can be removed from the target DBMS to maintain system load. The process shown in FIG. 6 may be implemented in a computer, such as, for example, offload manager server 108 in FIG. 1 or data processing system 200 in FIG. 2.

The process begins when the computer evaluates tables loaded on the target DBMS for a number of workload hits corresponding to each respective table (step 602). In response to the computer evaluating the tables, the computer makes a determination as to whether any of the tables have a corresponding number of workload hits less than a threshold number of workload hits (step 604). If the computer determines that none of the tables have a corresponding number of workload hits less than the threshold number of workload hits, no output of step 604, then the process terminates thereafter. If the computer determines that one or more of the tables has a corresponding number of workload hits less than the threshold number of workload hits, yes output of step 604, then the computer generates a list of tables having corresponding numbers of workload hits less than the threshold number of workload hits (step 606).

The computer selects a table from the list of tables (step 608). The computer makes a determination as to whether the selected table can be removed from the target DBMS (step 610). If the computer determines that the selected table cannot be removed from the target DBMS, no output of step 610, then the computer keeps the selected table on the target DBMS (step 612). Thereafter, the process proceeds to step 618. If the computer determines that the selected table can be removed from the target DBMS, yes output of step 610, then the computer adds the selected table to a table remove list (step 614). Moreover, the computer calculates a memory and CPU cost savings by removing the selected table from the target DBMS (step 616).

The computer makes a determination as to whether another table exists in the list of tables (step 618). If the computer determines that another table does exist in the list of tables, yes output of step 618, then the process returns to step 608 where the computer selects another table in the list of tables. If the computer determines that another table does not exist in the list of tables, no output of step 618, then the computer calculates a total memory and CPU cost savings by removing tables in the table remove list from the target DBMS (step 620).

Further, the computer generates a table remove recommendation for the target DBMS with the total memory and CPU cost savings (step 622). Furthermore, the computer automatically executes the table remove recommendation (step 624). Thereafter, the process terminates.

Figure 7:
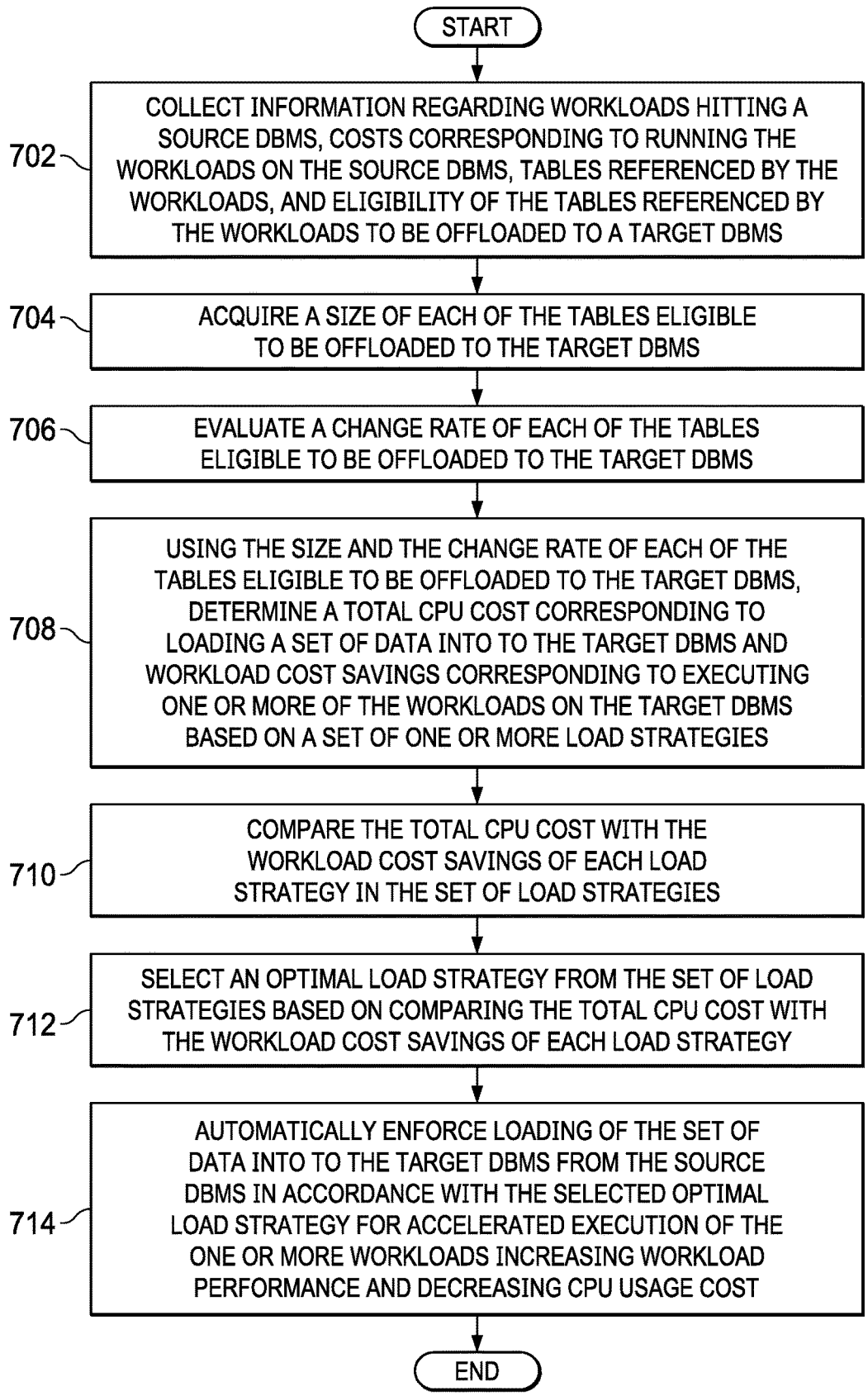
FIG. 7 is a flowchart illustrating a process for selecting an optimal load strategy in accordance with an illustrative embodiment.

With reference now to FIG. 7, a flowchart illustrating a process for selecting an optimal load strategy is shown in accordance with an illustrative embodiment. The process shown in FIG. 7 may be implemented in a computer, such as, for example, offload manager server 108 in FIG. 1 or data processing system 200 in FIG. 2.

The process begins when the computer collects information regarding workloads hitting a source DBMS, costs corresponding to running the workloads on the source DBMS, tables referenced by the workloads, and eligibility of the tables referenced by the workloads to be offloaded to a target DBMS (step 702). The computer also acquires a size of the tables eligible to be offloaded to the target DBMS (step 704). In addition, the computer evaluates a change rate of the tables eligible to be offloaded to the target DBMS (step 706).

Using the size and the change rate of the tables eligible to be offloaded to the target DBMS, the computer determines a total CPU cost corresponding to loading the subset of data into to the target DBMS and workload cost savings corresponding to executing one or more of the workloads on the target DBMS based on a set of one or more load strategies (step 708). The computer compares the total CPU cost with the workload cost savings of each load strategy in the set of load strategies (step 710).

The computer selects an optimal load strategy from the set of load strategies based on comparing the total CPU cost with the workload cost savings of each load strategy (step 712). Then, the computer automatically enforces loading of the subset of data into to the target DBMS in accordance with the selected optimal load strategy for accelerated execution of the one or more workloads (step 714). Thereafter, the process terminates.

Figure 8:
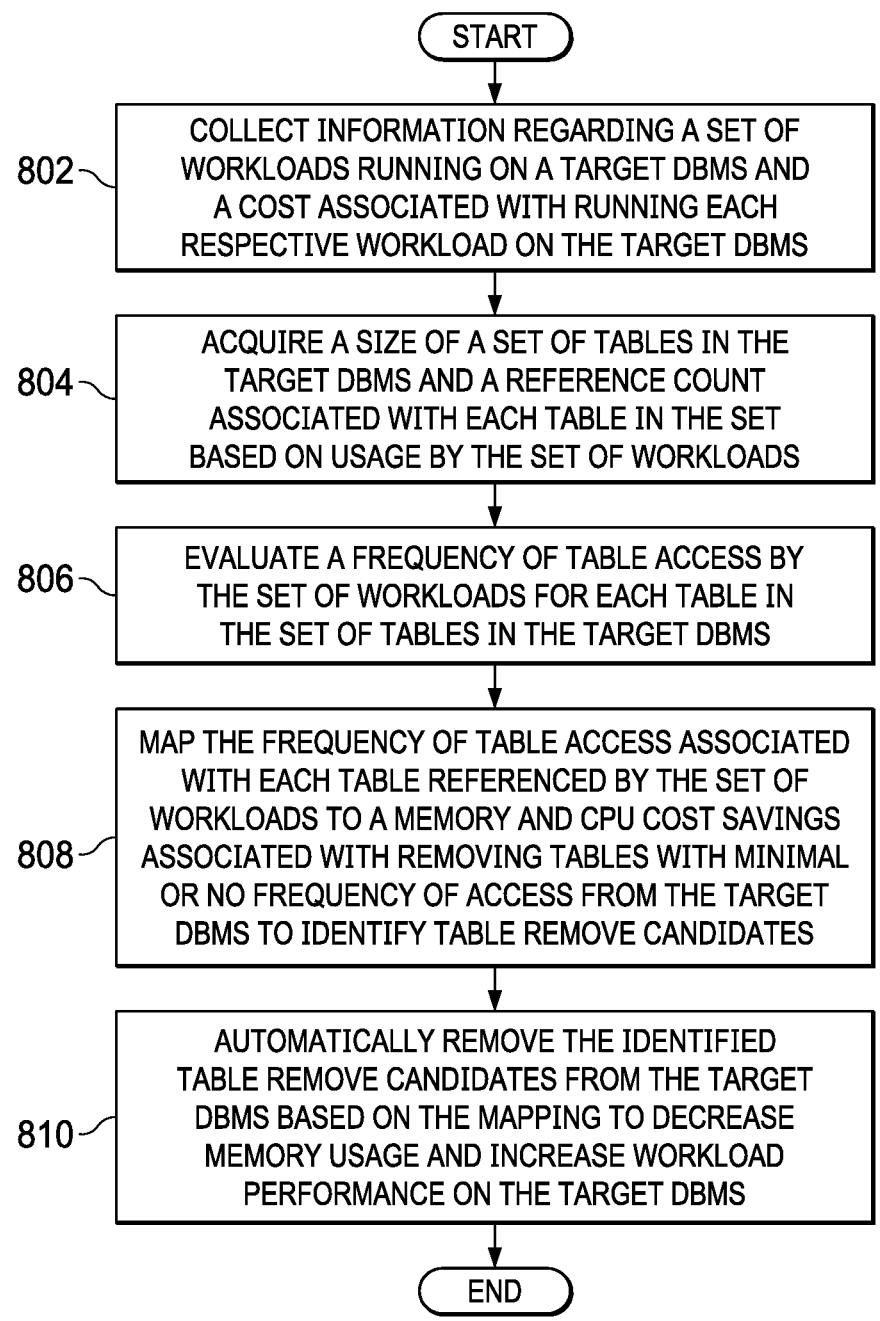
FIG. 8 is a flowchart illustrating a process for mapping table access frequency to memory and CPU cost savings in accordance with an illustrative embodiment.

With reference now to FIG. 8, a flowchart illustrating a process for mapping table access frequency to memory and CPU cost savings is shown in accordance with an illustrative embodiment. The process shown in FIG. 8 may be implemented in a computer, such as, for example, offload manager server 108 in FIG. 1 or data processing system 200 in FIG. 2.

The process begins when the computer collects information regarding a set of workloads running on a target DBMS and a cost associated with running each respective workload on the target DBMS (step 802). In addition, the computer acquires a size of a set of tables in the target DBMS and a reference count associated with each table in the set based on usage by the set of workloads (step 804). Further, the computer evaluates a frequency of table access by the set of workloads for each table in the set of tables in the target DBMS (step 806).

Afterward, the computer maps the frequency of table access associated with each table referenced by the set of workloads to a memory and CPU cost savings associated with removing tables with minimal or no frequency of access from the target DBMS to identify table remove candidates (step 808). Then, the computer automatically removes the identified table remove candidates from the target DBMS based on the mapping to decrease memory usage and increase workload performance on the target DBMS (step 810). Thereafter, the process terminates.

Thus, illustrative embodiments of the present invention provide a computer-implemented method, computer system, and computer program product for automatically optimizing computer memory and central processing unit resources used by a target database management system to increase workload performance. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for loading a set of data into a target database management system (DBMS) from a source DBMS to increase workload performance and decrease resource usage, the computer-implemented method comprising:

collecting, by a computer, real-time statistics from the source DBMS that include table size and table change rate information;

determining, by the computer, using collected size and change rate information corresponding to tables on the source DBMS eligible to be offloaded to the target DBMS, a total central processor unit (CPU) cost corresponding to loading the set of data into to the target DBMS and workload cost savings corresponding to executing one or more workloads on the target DBMS based on a set of one or more load strategies, wherein the set of load strategies is selected from a group consisting of a unload-based refresh strategy and an incremental update strategy;

comparing, by the computer, the total CPU cost with the workload cost savings of each load strategy in the set of load strategies;

selecting, by the computer, an optimal load strategy from the set of load strategies based on comparing the total CPU cost with the workload cost savings of each load strategy; and automatically loading, by the computer, the set of data into to the target DBMS from the source DBMS in accordance with the selected optimal load strategy for accelerated execution of the one or more workloads increasing workload performance and decreasing CPU cost.

2. The computer-implemented method of claim 1 further comprising:

collecting, by the computer, information regarding workloads hitting the source DBMS, costs corresponding to running the workloads on the source DBMS, tables referenced by the workloads, and eligibility of the tables referenced by the workloads to be offloaded to the target DBMS;

acquiring, by the computer, size information corresponding to each of the tables eligible to be offloaded from the source DBMS to the target DBMS; and evaluating, by the computer, change rate information corresponding to each of the tables eligible to be offloaded to the target DBMS.

3. The computer-implemented method of claim 1 further comprising:

collecting, by the computer, information regarding a set of workloads running on the target DBMS and a cost associated with running each respective workload on the target DBMS;

acquiring, by the computer, a size of a set of tables in the target DBMS and a reference count associated with each table in the set based on usage by the set of workloads;

evaluating, by the computer, a frequency of table access by the set of workloads for each table in the set of tables in the target DBMS;

mapping, by the computer, the frequency of table access associated with each table referenced by the set of workloads to a memory and CPU cost savings associated with removing tables with minimal or no frequency of access from the target DBMS to identify table remove candidates; and automatically removing, by the computer, the identified table remove candidates from the target DBMS based on the mapping to decrease memory usage and increase workload performance on the target DBMS.

4. The computer-implemented method of claim 1 further comprising:

collecting, by the computer, information from a source DBMS regarding a workload running on the source DBMS and a cost associated with running the workload on the source DBMS;

identifying, by the computer, a set of tables referenced by the workload using the collected information;

selecting, by the computer, a table from the set of tables; and determining, by the computer, whether the selected table is located in the target DBMS.

5. The computer-implemented method of claim 4 further comprising:

responsive to the computer determining that the selected table is not located in the target DBMS, determining, by the computer, an amount of data to load into the selected table by referencing catalog tables of the source DBMS;

calculate, by the computer, a CPU cost value for loading the amount of data into the selected table; and incrementing, by the computer, a CPU cost counter by the calculated CPU cost value.

6. The computer-implemented method of claim 5 further comprising:

determining, by the computer, a total CPU cost for loading data into the set of tables on the target DBMS based on the CPU cost counter;

comparing, by the computer, the total CPU cost of loading the data into the set of tables on the target DBMS with a workload cost savings of running the workload on the target DBMS;

responsive to the computer comparing the total CPU cost with the workload cost savings, determining, by the computer, whether the total CPU cost is greater than the workload cost savings; and responsive to the computer determining that the total CPU cost is less than the workload cost savings, generating, by the computer, a load strategy recommendation to load the data onto the set of tables in the target DBMS.

7. The computer-implemented method of claim 4 further comprising:

responsive to the computer determining that the selected table is located in the target DBMS, determining, by the computer, whether incremental update is enabled on the selected table;

responsive to the computer determining that incremental update is not enabled on the selected table, determining, by the computer, whether the selected table is partitioned;

responsive to the computer determining that the selected table is partitioned, calculating, by the computer, a CPU cost value for partition reload of the selected table; and incrementing, by the computer, a CPU cost counter by the calculated CPU cost value for the partition reload of the selected table.

8. The computer-implemented method of claim 7 further comprising:

responsive to the computer determining that the selected table is not partitioned, calculating, by the computer, a CPU cost value for reloading the selected table entirely; and incrementing, by the computer, the CPU cost counter by the calculated CPU cost value for reloading the selected table entirely.

9. The computer-implemented method of claim 7 further comprising:

responsive to the computer determining that incremental update is enabled on the selected table, collecting, by the computer, real-time statistics data corresponding to the selected table;

determining, by the computer, whether the selected table is still eligible for incremental update based on the collected real-time statistics data corresponding to the selected table;

responsive to the computer determines that the selected table is not still eligible for incremental update based on the collected real-time statistics data, stopping, by the computer, the incremental update of the selected table;

calculating, by the computer, a current CPU cost value for the incremental update of the selected table so far; and incrementing, by the computer, the CPU cost counter by the calculated current CPU cost value for the incremental update of the selected table so far.

10. The computer-implemented method of claim 9 further comprising:
responsive to the computer determining that the selected table is still eligible for incremental update based on the collected real-time statistics data, continuing, by the computer, the incremental update of the selected table;
calculating, by the computer, the current CPU cost value for the incremental update of the selected table so far; and
incrementing, by the computer, the CPU cost counter by the calculated current CPU cost value for the incremental update of the selected table so far.

11. The computer-implemented method of claim 1 further comprising:
evaluating, by the computer, tables loaded on the target DBMS for a number of workload hits corresponding to each respective table;
responsive to the computer evaluating the tables, determining, by the computer, whether any of the tables have a corresponding number of workload hits less than a threshold number of workload hits; and
responsive to the computer determining that one or more of the tables has a corresponding number of workload hits less than the threshold number of workload hits, generating, by the computer, a list of tables having corresponding numbers of workload hits less than the threshold number of workload hits.

12. The computer-implemented method of claim 11 further comprising:
calculating, by the computer, a total memory and CPU cost savings by removing the tables in the table remove list from the target DBMS;
generating, by the computer, a table remove recommendation for the target DBMS with the total memory and CPU cost savings; and
automatically executing, by the computer, the table remove recommendation.

13. The computer-implemented method of claim 1, wherein determined workload cost savings for a particular table include predicted future queries of the particular table.

14. A computer system for loading a set of data into a target database management system (DBMS) from a source DBMS to increase workload performance and decrease resource usage, the computer system comprising:
a bus system;
a storage device connected to the bus system, wherein the storage device stores program instructions; and
a processor connected to the bus system, wherein the processor executes the program instructions to:
collect real-time statistics from the source DBMS that include table size and table change rate information;
determine, using collected size and change rate information corresponding to tables on the source DBMS eligible to be offloaded to the target DBMS, a total central processing unit (CPU) cost corresponding to loading the set of data into to the target DBMS and workload cost savings corresponding to executing one or more workloads on the target DBMS based on a set of one or more load strategies, wherein the set of load strategies is selected from a group consisting of a unload-based refresh strategy and an incremental update strategy;
compare the total CPU cost with the workload cost savings of each load strategy in the set of load strategies;
select an optimal load strategy from the set of load strategies based on comparing the total CPU cost with the workload cost savings of each load strategy; and
automatically load the set of data into to the target DBMS from the source DBMS in accordance with the selected optimal load strategy for accelerated execution of the one or more workloads increasing workload performance and decreasing CPU cost.

15. The computer system of claim 14, wherein the processor further executes the program instructions to:
collect information regarding workloads hitting the source DBMS, costs corresponding to running the workloads on the source DBMS, tables referenced by the workloads, and eligibility of the tables referenced by the workloads to be offloaded to the target DBMS;
acquire size information corresponding to each of the tables eligible to be offloaded from the source DBMS to the target DBMS; and
evaluate change rate information corresponding to each of the tables eligible to be offloaded to the target DBMS.

16. A computer program product for loading a set of data into a target database management system (DBMS) from a source DBMS to increase workload performance and decrease resource usage, the computer program product comprising a computer readable storage medium having program instructions embodied therewith, the program instructions executable by a computer to cause the computer to perform a method comprising:
collecting, by the computer, real-time statistics from the source DBMS that include table size and table change rate information;
determining, by the computer, using collected size and change rate information corresponding to tables on the source DBMS eligible to be offloaded to the target DBMS, a total central processor unit (CPU) cost corresponding to loading the set of data into to the target DBMS and workload cost savings corresponding to executing one or more workloads on the target DBMS based on a set of one or more load strategies, wherein the set of load strategies is selected from a group consisting of a unload-based refresh strategy and an incremental update strategy;
comparing, by the computer, the total CPU cost with the workload cost savings of each load strategy in the set of load strategies;
selecting, by the computer, an optimal load strategy from the set of load strategies based on comparing the total CPU cost with the workload cost savings of each load strategy; and
automatically loading, by the computer, the set of data into to the target DBMS from the source DBMS in accordance with the selected optimal load strategy for accelerated execution of the one or more workloads increasing workload performance and decreasing CPU cost.

17. The computer program product of claim 16 further comprising:
collecting, by the computer, information regarding workloads hitting the source DBMS, costs corresponding to running the workloads on the source DBMS, tables referenced by the workloads, and eligibility of the tables referenced by the workloads to be offloaded to the target DBMS;

acquiring, by the computer, size information corresponding to each of the tables eligible to be offloaded from the source DBMS to the target DBMS; and evaluating, by the computer, change rate information corresponding to each of the tables eligible to be offloaded to the target DBMS.

18. The computer program product of claim 16 further comprising:

collecting, by the computer, information regarding a set of workloads running on the target DBMS and a cost associated with running each respective workload on the target DBMS;

acquiring, by the computer, a size of a set of tables in the target DBMS and a reference count associated with each table in the set based on usage by the set of workloads;

evaluating, by the computer, a frequency of table access by the set of workloads for each table in the set of tables in the target DBMS;

mapping, by the computer, the frequency of table access associated with each table referenced by the set of workloads to a memory and CPU cost savings associated with removing tables with minimal or no frequency of access from the target DBMS to identify table remove candidates; and automatically removing, by the computer, the identified table remove candidates from the target DBMS based on the mapping.

19. The computer program product of claim 16 further comprising:

collecting, by the computer, information from a source DBMS regarding a workload running on the source DBMS and a cost associated with running the workload on the source DBMS;

identifying, by the computer, a set of tables referenced by the workload using the collected information;

selecting, by the computer, a table from the set of tables; and determining, by the computer, whether the selected table is located in the target DBMS.

20. The computer program product of claim 19 further comprising:

responsive to the computer determining that the selected table is not located in the target DBMS, determining, by the computer, an amount of data to load into the selected table by referencing catalog tables of the source DBMS;

calculate, by the computer, a CPU cost value for loading the amount of data into the selected table; and incrementing, by the computer, a CPU cost counter by the calculated CPU cost value.

21. The computer program product of claim 20 further comprising:

determining, by the computer, a total CPU cost for loading data into the set of tables on the target DBMS based on the CPU cost counter;

comparing, by the computer, the total CPU cost of loading the data into the set of tables on the target DBMS with a workload cost savings of running the workload on the target DBMS;

responsive to the computer comparing the total CPU cost with the workload cost savings, determining, by the computer, whether the total CPU cost is greater than the workload cost savings; and responsive to the computer determining that the total CPU cost is less than the workload cost savings, generating, by the computer, a load strategy recommendation to load the data onto the set of tables in the target DBMS.

22. The computer program product of claim 19 further comprising:

responsive to the computer determining that the selected table is located in the target DBMS, determining, by the computer, whether incremental update is enabled on the selected table;

responsive to the computer determining that incremental update is not enabled on the selected table, determining, by the computer, whether the selected table is partitioned;

responsive to the computer determining that the selected table is partitioned, calculating, by the computer, a CPU cost value for partition reload of the selected table; and incrementing, by the computer, a CPU cost counter by the calculated CPU cost value for the partition reload of the selected table.

23. The computer program product of claim 22 further comprising:

responsive to the computer determining that the selected table is not partitioned, calculating, by the computer, a CPU cost value for reloading the selected table entirely; and incrementing, by the computer, the CPU cost counter by the calculated CPU cost value for reloading the selected table entirely.

24. The computer program product of claim 22 further comprising:

responsive to the computer determining that incremental update is enabled on the selected table, collecting, by the computer, real-time statistics data corresponding to the selected table;

determining, by the computer, whether the selected table is still eligible for incremental update based on the collected real-time statistics data corresponding to the selected table;

responsive to the computer determines that the selected table is not still eligible for incremental update based on the collected real-time statistics data, stopping, by the computer, the incremental update of the selected table;

calculating, by the computer, a current CPU cost value for the incremental update of the selected table so far; and incrementing, by the computer, the CPU cost counter by the calculated current CPU cost value for the incremental update of the selected table so far.

25. The computer program product of claim 24 further comprising:

responsive to the computer determining that the selected table is still eligible for incremental update based on the collected real-time statistics data, continuing, by the computer, the incremental update of the selected table;

calculating, by the computer, the current CPU cost value for the incremental update of the selected table so far; and incrementing, by the computer, the CPU cost counter by the calculated current CPU cost value for the incremental update of the selected table so far.

* * * * *